US006505064B1

United States Patent
Liu et al.

(10) Patent No.: US 6,505,064 B1
(45) Date of Patent: Jan. 7, 2003

(54) DIAGNOSTIC IMAGING SYSTEMS AND METHODS EMPLOYING TEMPORALLY RESOLVED INTENSITY TRACING

(75) Inventors: Kecheng Liu, Solon, OH (US); Paul M. Margosian, Lakewood, OH (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 19 days.

(21) Appl. No.: 09/644,034

(22) Filed: Aug. 22, 2000

(51) Int. Cl.[7] .................................................. A61B 5/055
(52) U.S. Cl. ........................ 600/420; 600/431; 382/276; 324/307; 324/309
(58) Field of Search ................................ 600/410, 420, 600/419, 407, 431, 425; 324/307, 309; 703/5; 382/210, 128, 285, 276; 345/424, 124; 128/922

(56) References Cited

U.S. PATENT DOCUMENTS

| 5,295,488 A | * | 3/1994 | Lloyd et al. ................. 324/309 |
| 5,331,552 A | * | 7/1994 | Lloyd et al. ................. 378/15 |
| 5,412,763 A | * | 5/1995 | Knoplioch et al. .......... 345/419 |
| 6,123,733 A | * | 9/2000 | Dalton ........................ 324/307 |

FOREIGN PATENT DOCUMENTS

| EP | 0506302 A2 | * | 9/1992 | ........... G01R/33/56 |
| EP | 1182613 A2 | * | 2/2002 | ........... G06T/11/00 |
| WO | WO 98/24064 | * | 6/1998 | ........... G60T/11/00 |

* cited by examiner

Primary Examiner—Marvin M. Lateef
Assistant Examiner—Eleni Mantis Mercader
(74) Attorney, Agent, or Firm—Fay, Sharpe, Fagan, Minnich & McKee, LLP (57) ABSTRACT

A diagnostic imaging system (100, 200) and method generates a plurality of temporally resolved volume image representations (130, 132, . . . , 134). A time course projection processor (140, 240) temporally collapses the volume image representations. A spatial projection processor (146, 246) performs a maximum or minimum intensity process along rays through voxels of a three-dimensional image representation. By sequentially temporally collapsing and maximum or minimum intensity projecting, in either order, the plurality of temporally resolved volume image representations is reduced to a two-dimensional temporally collapsed and spatially projected image representation (148, 248). In preferred embodiments, the present invention is directed to angiography, and more preferably to magnetic resonance angiography. In certain embodiments, time course information, such as blood flow rate information, vessel wall dynamics, contrast agent propagation, contrast agent peak arrival time, and the like, is logged in a database (142), providing additional diagnostic information or timing information for future reference. In this manner, more accurate images of vessel lumina, as well as blood flow time variant effects, are obtained.

28 Claims, 5 Drawing Sheets

DIAGNOSTIC IMAGING SYSTEMS AND METHODS EMPLOYING TEMPORALLY RESOLVED INTENSITY TRACING

BACKGROUND OF THE INVENTION

The present invention relates generally to the art of diagnostic imaging. It finds particular application to magnetic resonance angiography (MRA) techniques, apparatuses, as well as to methods and apparatuses for the digital processing of image data acquired by the same. Although the present invention is illustrated and described herein primarily with reference to magnetic resonance angiography, it will be appreciated that the present invention is also amenable to other imaging modalities and to subjects other than the human body.

Commonly, in MRI, a substantially uniform temporally constant main magnetic field ($B_0$) is set up in an examination region in which a subject being imaged or examined is placed. Via magnetic resonance radio frequency (RF) excitation and manipulations, selected magnetic dipoles in the subject which are otherwise aligned with the main magnetic field are tipped to excite magnetic resonance. The resonance is typically manipulated to induce detectable magnetic resonance echoes from a selected region of the subject. In imaging, the echoes are spatially encoded via magnetic gradients set up in the main magnetic field. The raw data from the MRI scanner is collected into a matrix, commonly known as k-space. By employing inverse Fourier, two-dimensional Fourier, three-dimensional Fourier, or other known transformations, an image representation of the subject is reconstructed from the k-space data.

A number of MR angiography (MRA) techniques have been developed for imaging the vascular system. Time-of-flight (TOF) techniques rely on the time interval between the transverse excitation of spins and the acquisition of the resulting magnetic resonance signal to distinguish between moving and stationary spins. During the time interval, fresh spins move into the region from which the magnetic resonance signal is acquired and excited spins move out of the region. In contrast, the stationary spins remain fixed during the interval between RF excitation and data acquisition, with the result that the magnetic resonance signal produced by stationary spins is substantially different in magnitude from that produced by moving spins. When an image is reconstructed from such magnetic resonance signals, the image pixels which correspond to moving spins are either much brighter or much darker than image pixels corresponding to stationary spins, depending on the sequence. In this manner, the vascular system that transports moving blood is made to appear brighter or darker than the surrounding stationary or slowly moving tissues in the resultant image.

Phase contrast techniques rely on the fact that the phase of the magnetic resonance signal produced by moving spins is different from the phase of magnetic resonance signals produced by stationary or slowly moving spins. Phase contrast methods employ magnetic field gradients during the magnetic resonance pulse sequence which cause the phase of the resulting magnetic resonance signals to be modulated as a function of spin velocity. The phase of the magnetic resonance signals can, therefore, be used to control the contrast, or brightness, of the pixels in the reconstructed image. Since blood is moving relatively fast, the vascular system is made to appear brighter or darker in the resulting image.

Contrast-enhanced magnetic resonance angiography has been employed to enhance the diagnostic capability of magnetic resonance angiography. In contrast-enhanced magnetic resonance angiography, a contrast agent such as gadolinium is injected into the patient prior to the scan. The injection is carefully timed so that the central lines of k-space, which govern image contrast, are acquired during peak arterial enhancement, i.e., at the moment the bolus of contrast agent is flowing through the vasculature of interest.

Irrespective of the method used to acquire the magnetic resonance data, MRI can be used to produce volume image data comprising a three-dimensional (3D) array of voxel intensities. This volume image data can be acquired using a three-dimensional pulse sequence or with two-dimensional (2D) pulse sequences applied to a plurality of adjacent slices. Also, three-dimensional pulse sequences can be applied to a plurality of adjacent subvolumes to achieve coverage of the desired volume of interest.

Maximum intensity projection (MIP) is a common and powerful tool for rendering three-dimensional volume image data sets, and is particularly useful in connection with magnetic resonance angiographic images. Projection images are especially useful for screening vascular morphology and pathological diseases, such as stenosis, atherosclerosis, and aneurysm. In clinical diagnosis, viewing projection images is generally preferable to viewing individual MRI slice images.

An MIP image is essentially a projection of a three-dimensional volume onto a two-dimensional plane from a designated viewing point or along a designated viewing angle or projection angle. In producing an MIP image, a ray is projected from each pixel in the two-dimensional projection image plane through the three-dimensional array of image data points. The value for the data point along the ray that has the maximum intensity value is selected. The value thus selected for each ray is used to control the gray scale of its corresponding pixel in the resultant two-dimensional image. MIP images can be acquired from different viewing angles or viewing positions, providing radiologists with flexibility to study cases. Similarly, minimum intensity projection (MinIP) is used for black blood angiographic applications. In MinIP, the resonance response from flowing blood is minimized by the magnetic resonance sequence such that blood is depicted as black in the resultant image. The lowest voxel intensity along each ray is assigned to the corresponding pixel in the resultant two-dimensional projection image.

In contrast angiography, the bolus of contrast agent moves dynamically through the image area. Also, blood surges and slows cyclically with the cardiac cycle. The MR images freeze this motion as a snap shot in time. In some examinations, multiple images are acquired displaced in time or phase of the cardiac cycle. The region of interest is then displayed in a cinematic display.

Current MIP techniques do not include the time variant effect of blood flow behavior, e.g., affected by cardiac cycle, arrival and departure of contrast substances, etc. Rather, they assume that the acquired blood flow behavior is static. Although a number of algorithms have been developed to increase vessel edge definition, such as reconstruction grid repositioning and various interpolation techniques, such techniques cannot correct inaccuracies due to such time varying effects.

Accordingly, the present invention contemplates a new and improved magnetic resonance angiography apparatus and method wherein the time varying effects are incorporated into the final projection which overcomes the above-referenced problems and others.

SUMMARY OF THE INVENTION

In accordance with a first aspect of the present invention, an angiographic imaging method is provided. A plurality of temporally displaced volumetric image representations of a volume of interest is generated, each depicted by a three-dimensional array of voxel values. The plurality of three-dimensional arrays of voxel values is temporally collapsed in accordance with a selected criterion to generate a temporally collapsed three-dimensional array of voxel values, which is projected in a selected direction in accordance with the selected criterion to generate a two-dimensional image representation.

In accordance with another aspect of the present invention, a diagnostic imaging method is provided. A plurality of temporally displaced volumetric image representations of a volume of interest is generated, each depicted by a three-dimensional array of voxel values. The plurality of temporally displaced volumes is then spatially and temporally collapsed in accordance with a selected criterion to generate a spatially and temporally collapsed two-dimensional image representation.

In accordance with another aspect of the present invention, an image processing system is provided. A reconstruction processor and associated memory generates and stores a plurality of volume image representations of a volume of interest corresponding to a plurality of offset times. A time course projection processor and associated memory temporally collapses and stores a plurality of temporally offset image representations into a single temporally collapsed image representation. A spatial projection processor and associated memory generates two-dimensional spatially projected image representations from the volume image representations. A first of the time course and spatial projection processors is connected with the reconstruction processor and a second of the time course and spatial projection processors is connected with the first for generating a two-dimensional temporally collapsed and spatially projected image representation. A display apparatus converts the two-dimensional temporally collapsed and spatially projected image representation into a human-viewable image.

One advantage of the present invention is that it improves accuracy in depicting blood vessel lumen of imaged blood vessels.

Another advantage is that it captures blood flow time variations in vivo.

Another advantage of the present invention is that it compensates for the dynamics of the blood vessel wall, e.g., fluctuating lumen size.

Another advantage of the present invention resides in its ready adaptability to myriad diagnostic imaging acquisition techniques.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
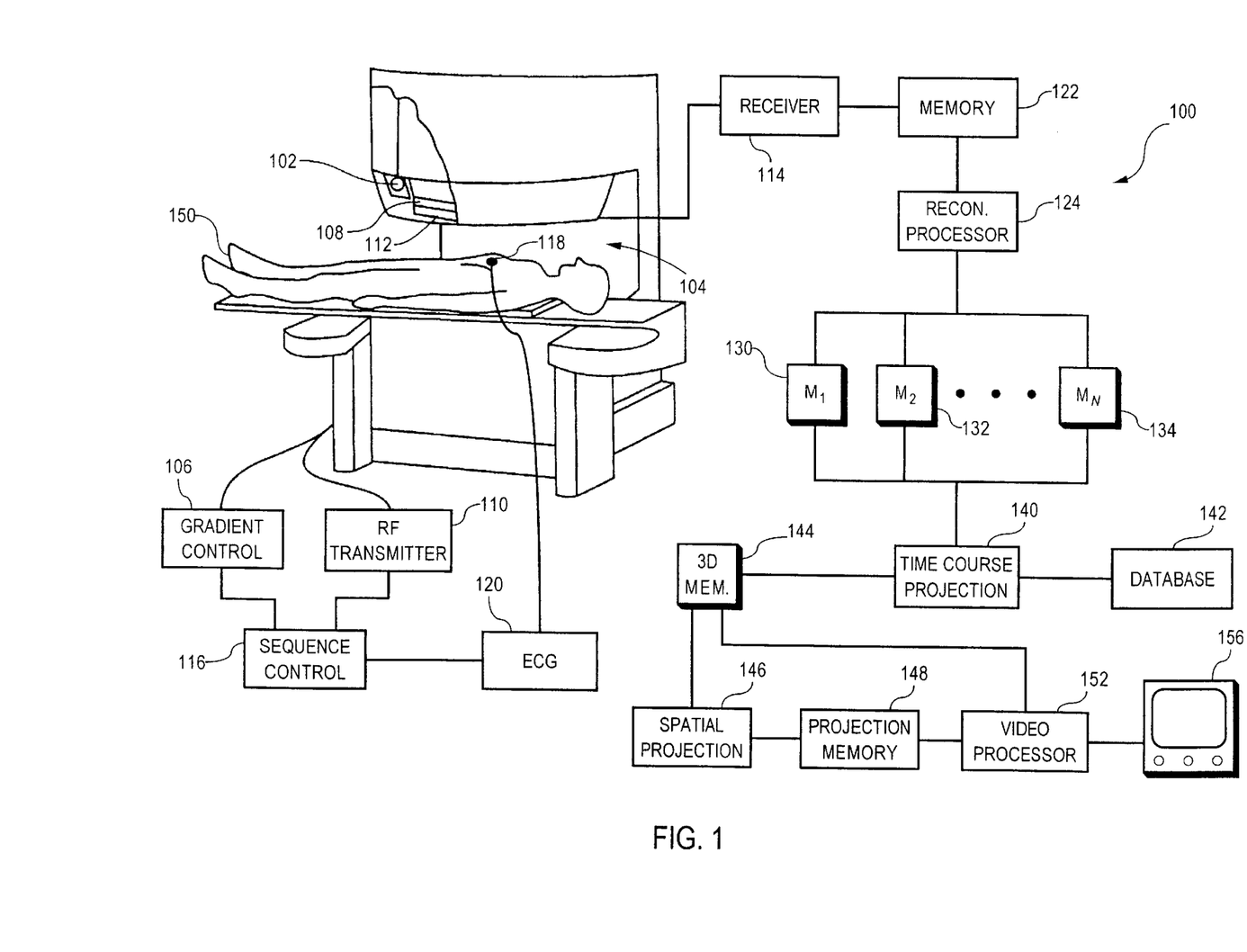
FIG. 1 is a diagrammatic illustration of a magnetic resonance imaging scanner including temporally resolved intensity tracing in accordance with aspects of the present invention.

With reference to FIG. 1, a magnetic resonance imaging system 100 includes superconducting, permanent, or resistive magnets 102 which create a substantially uniform, temporally constant magnetic field B, through an examination region 104. Although an open magnet system is illustrated in FIG. 1, the present invention is equally applicable to other known types of MRI scanners, such as those using a bore-type magnet. The invention is also applicable to other imaging modalities, such as computed tomography, nuclear medicine, digital x-ray, and the like. Gradient pulse amplifiers 106 apply current pulses to selected ones or pairs of whole body gradient coils 108 to create magnetic field gradients along x-, y-, and z-axes of the examination region 104. A radio frequency transmitter 110, which is optionally a digital transmitter, is connected to a whole body radio frequency coil 112 to transmit RF pulses into the examination region 104. A second set of magnet coils, gradient coils and radio frequency coils are disposed below the patient as the lower pole piece. The whole body radio frequency coil 112 or alternatively, a surface coil array (not shown), is connected with a receiver 114 for demodulating the resultant resonance signals.

A sequence controller 116 controls the gradient amplifiers 106 and the transmitter 110 to generate a magnetic resonance angiography scanning sequence. More specifically, the digital transmitter is caused to generate a series of RF and magnetic field gradient pulses that are applied to the subject to invert or excite magnetic spins, induce magnetic resonance, refocus magnetic resonance, manipulate magnetic resonance, spatially and otherwise encode the magnetic resonance, to saturate spins, and the like, in a selected volume of the body. The sequence generated may be any conventional three-dimensional vascular imaging sequence or two-dimensional vascular imaging sequence for generating a plurality of parallel 2D image data sets which are stacked into a 3D image. The MRI method can also be any dynamic method, any gated acquisition method, with or without the use of a contrast agent. An exemplary gated acquisition uses an electrocardiogram signal as a trigger, for example, QRS complex. Exemplary contrast MRA techniques include Keyhole, TRICK, spiral interleaved, centric encoding, and so forth. The sequence will generally be one of a plurality of user-selectable preprogrammed imaging sequences, e.g., stored in a sequence control memory of the sequence controller 116.

In certain embodiments wherein electrocardiographic gating is employed, an optional electrocardiograph (ECG) sensor 118 is attached to a patient 150 and outputs an electric ECG signal of the patient. An ECG gate pulse generator 120 outputs a gate pulse as an ECG gating signal to the sequence controller 116. The gate pulses have a very small pulse width synchronous with the peak values of R-waves of the ECG signal. The gate pulses are utilized by the sequence controller 116 as an ECG gating signal to produce an ECG gated scan, e.g., by controlling the start timing and other sequence scanning parameters.

The signals are received and demodulated by the receiver 114 and sampled into a k-space data memory 122. The data in memory 122 is reconstructed into volume image data by a reconstruction or array processor 124 using conventional techniques. The array processor 124 supplies volume image data for the same selected volume to each of N volume image memories 130, 132, . . . , 134, where N is the number of volume image data sets to be acquired and is at least two. The volume image data sets are acquired at different times.

In certain embodiments, for example, if the volume image data is generated by a 2D multi-slice method, each data slice can be separately subjected to a two-dimensional Fourier transform by reconstruction processor 124 to produce a two-dimensional array of pixel intensities for each slice which are supplied to a first volume image memory 130. The collection of pixel values for the multiple slices builds a three-dimensional array of voxel intensities.

In certain other embodiments, such as 3D time-off-flight techniques, 3D phase contrast or phase sensitive techniques, and so forth, a three-dimensional array of k-space data is read into data memory 122. The three-dimensional k-space array is subjected to a three-dimensional inverse Fourier Transform by the processor 124 and stored as a three-dimensional array of voxel intensities in volume image memory 130.

In still other embodiments, an inverse Fourier transform is performed on each received data line, which is stored in a memory until a full set of transformed data lines are generated. A second inverse Fourier transform can then be performed in the phase encode direction on the data to generate slice data which is stored in a memory. The above steps are repeated for each slice until voxel intensities for the entire imaged volume are stored in volume memory 130. In certain embodiments, 3D volume imaging may be employed for a plurality of adjacent subvolumes which are then combined to form the volume of interest.

Irrespective of the scanning and data acquisition procedure, volume images $M_1, M_2, \ldots, M_N$ for the selected region is acquired at N different times and the plurality of volume image data sets are stored in the N volume memories 130, 132, . . . , 134.

Time resolved intensity tracing (140) and spatial intensity projection (146) are, for the sake of brevity, described herein primarily by way of reference to maximum intensity tracing and maximum intensity projection. However, the present invention contemplates the use of minimum intensity values for the time resolved tracing and the spatial projection for MRA applications in which the blood vessels are to appear dark, and the description herein is equally applicable thereto.

The plurality of volume image data sets stored in memories 130, 132, . . . , 134, are temporally collapsed by time course projection processor 140 which searches out the maximum intensity voxel value for corresponding voxels of each imaged volume in the temporally displaced memories 130, 132, . . . , 134. A temporally collapsed volume data set for the selected volume is generated and stored in volume memory 144 by comparing voxel intensities stored in memories 130, 132, . . . , 134, and assigning to each voxel in the time collapsed volume image data set the maximum intensity found therein for each spatial position.

In certain embodiments, time resolved data is collected and the time course projection is performed for all spatial coordinates within the original volume of interest. However, it is not necessary that time resolved data be acquired and/or the time course projection be performed for all spatial coordinates within the entire original volume of interest. In other embodiments, time resolved data acquisition and/or time course projection is limited to one or more particular subvolumes of interest that are smaller than and contained within the original volume of interest. Thus, in some embodiments, the 3D memory 144 receives the temporally collapsed data only for selected spatial coordinates within the subvolume(s) of interest. Non-time resolved values are loaded for all other areas within the original volume of interest that are outside the subvolumes of interest. In this manner, data acquisition times and/or image reconstruction times can be reduced.

In one embodiment, time course projection processor 140 further optionally includes a memory or database 142 for logging temporal information and events for the volume imaged. Such temporal information can be used to supplement the acquired angiogram in clinical diagnosis. Such information includes, for example, time course of bolus propagation and peak time of bolus arrival (for contrast techniques), fresh/fast blood arrival (for non-contrast and/or gating techniques), time differences between different vessels, such as arteries and veins, and so forth. This information itself can be used for clinical diagnosis of various physical or pathological conditions, thus providing auxiliary diagnostic information in addition to the acquired angiogram. For example, a later and/or slow filling vessel can indicate a possible occlusion or other circulatory malfunction. The database 142 of time course information can also stored for future reference. In one embodiment, timing information in database 142 can be used to store patient-specific of vessel-specific blood flow rate information, and in certain embodiments, can be used, e.g., by sequence controller 116, to adjust scan timing for subsequent acquisitions.

A projection processor 146 forms a maximum intensity projection (MIP) of the temporally collapsed volume data from a selected viewing point or along a selected viewing direction or axis, and the 2D projection image representation is stored in a projection image memory 148. A video processor 152 converts the image representation in the projection memory 148 into an appropriate format for display as an MIP image on a video monitor 154.

In certain embodiments of the temporally resolved intensity tracing MIP technique of the present invention, MIP processor 146 is one module of an image processor having additional modules providing additional functions appropriate to angiography, including processors or program modules for angle selection, recrop, background suppression, interpolation, reconstruction grid repositioning, and the like.

The video processor 152 is also connected directly with the 3D temporally collapsed image memory to select image data directly therefrom. The video processor can select various slice images, or the like. It or associated processors, not shown, can process surface renderings and other conventional image displays.

Figure 2:
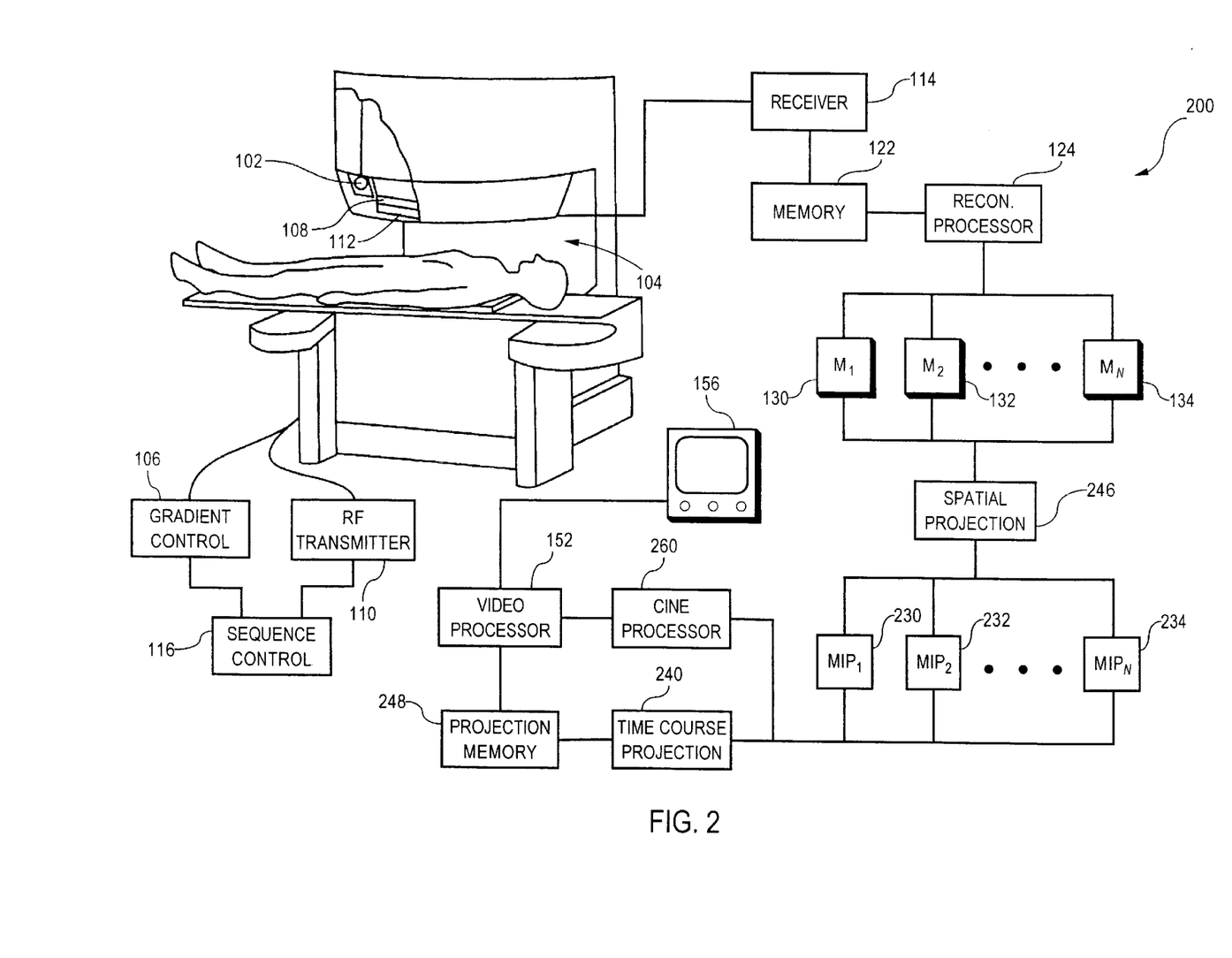
FIG. 2 illustrates an alternative embodiment of a magnetic resonance imaging scanner of the present invention.

In the embodiment depicted in FIG. 1, the time course projection 140 is performed prior to the spatial projection 146. However, it will be recognized that the order of performing the time course intensity tracing and the maximum intensity projection can be reversed. FIG. 2 depicts an alternative embodiment of the present invention similar to that of FIG. 1, but wherein each of the volume image representations stored in the volume memories 130, 132, . . . , 134 is maximum intensity projected via a projection processor 246 to produce a plurality of time displaced 2D projection image representations stored in a corresponding number of 2D image memories 230, 232, . . . , 234. The collection of 2D projections thus produced are then temporally collapsed using a time course projection processor 240 into a final temporally and spatially projected 2D image representation that is stored in a memory 248. Optionally, the video processor 152 is connected with the projection image memories 230, 232, . . . , 234, by a cine processor 260 so that the use can elect cinematic displays of the time evolution of the projection images.

Figure 3:
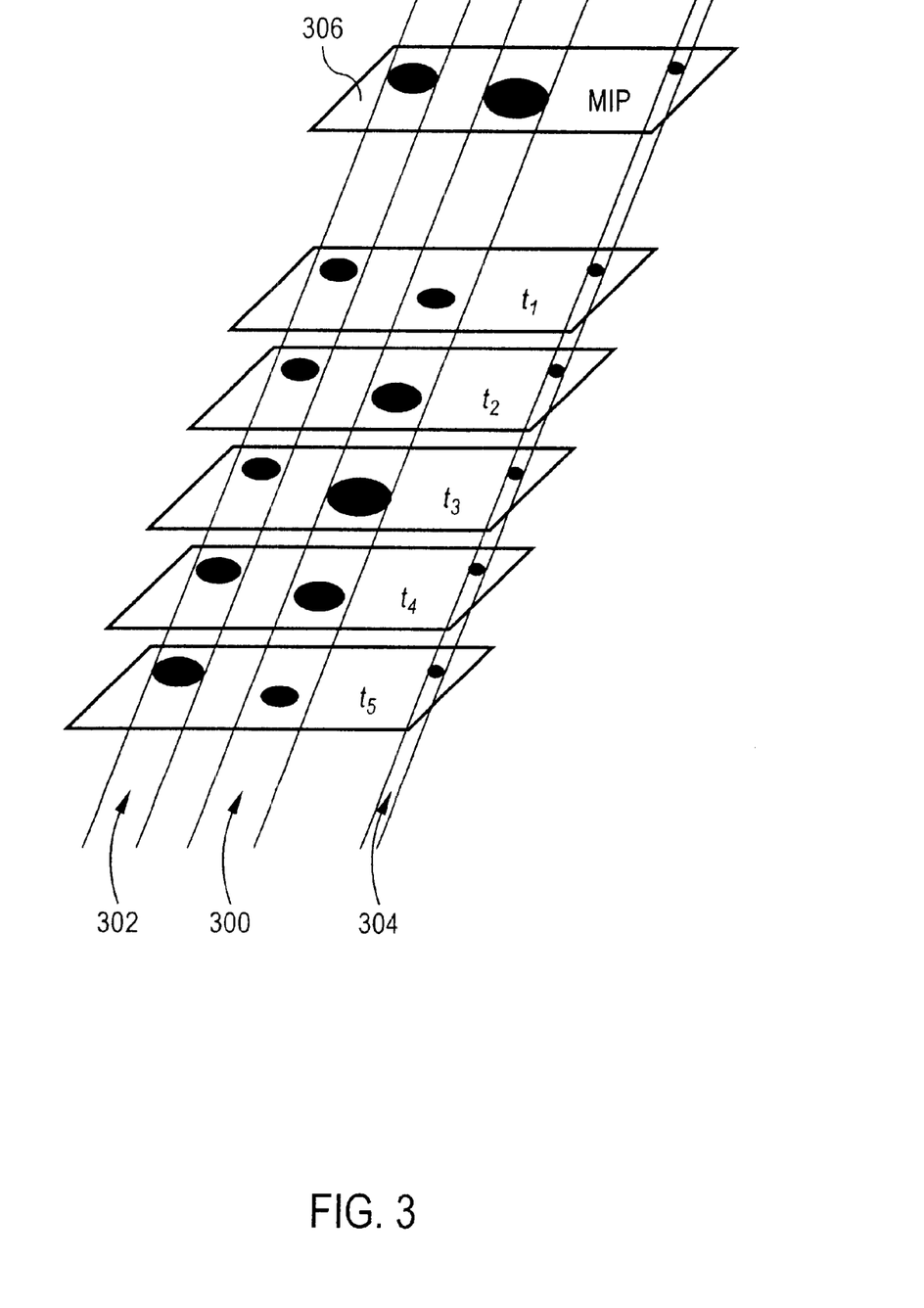
FIG. 3 illustrates the application of time course projection in accordance with this teaching to provide voxel values representative of the true lumen of a blood vessel under examination.

FIG. 3 illustrates the application of time course projection processor 140 (FIG. 1) or time course projection processor 240 (FIG. 2) to provide voxel values representative of the true lumen of blood vessels under examination. A first blood vessel 300, such as an artery, expands with the pumping action of the heart, reaching a maximum diameter at time $t_3$. A second blood vessel 302, such as a branch artery, is expanded to its maximum to its maximum diameter by the cardiac pulse a short time later at time $t_5$. A third blood vessel 304, such as an occluded artery, maintains a substantial constant value over the cardiac cycle. Note that a single image taken at time t, would be ineffective for identifying the occluded artery. A single image at time $t_3$ or $t_5$ would be difficult to diagnose. In a maximum or minimum intensity image 306, each vessel appears as its maximum diameter. The technique also captures other time variant effects, such as other blood flow changes, arrival and departure of contrast agents, cardiac cycle effects, fluctuating lumen size and other dynamics of the blood vessel wall, and so forth.

Figure 4:
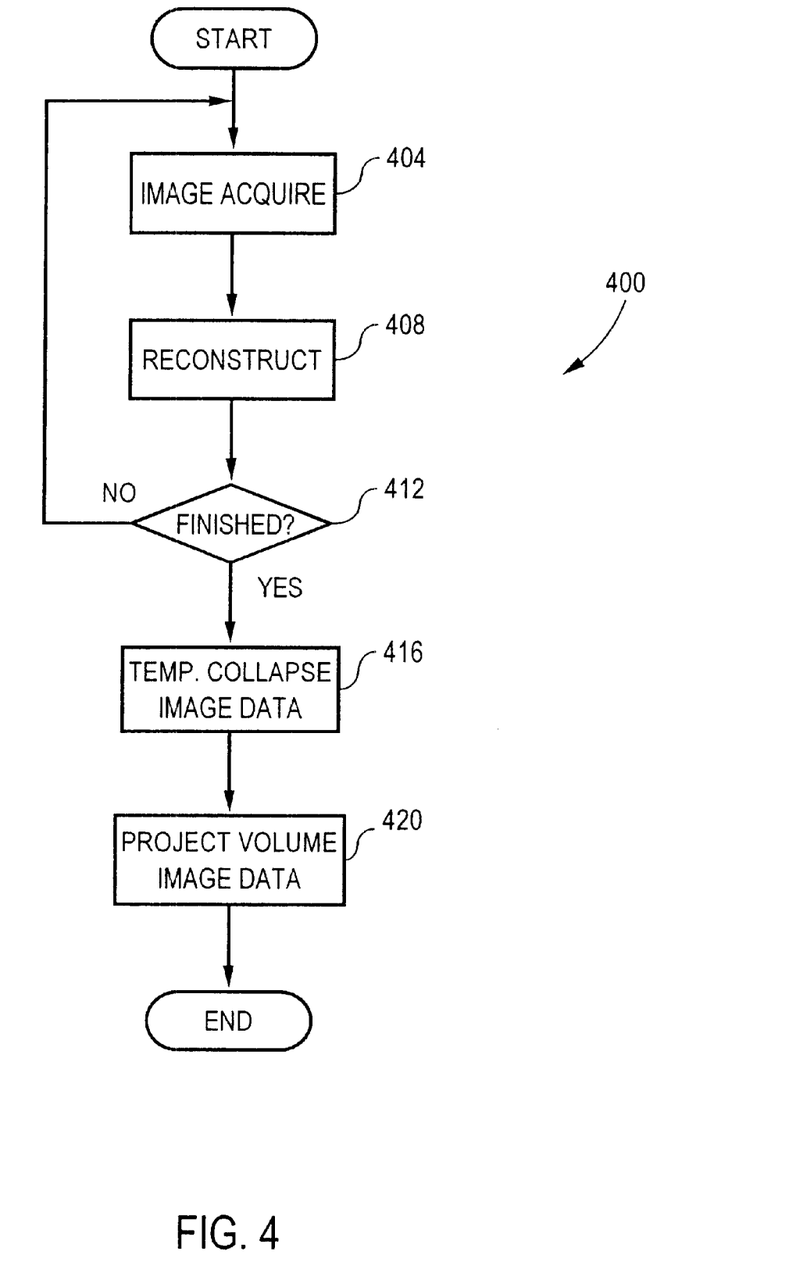
FIG. 4 is a flow chart outlining an exemplary method of the present invention.
Figure 5:
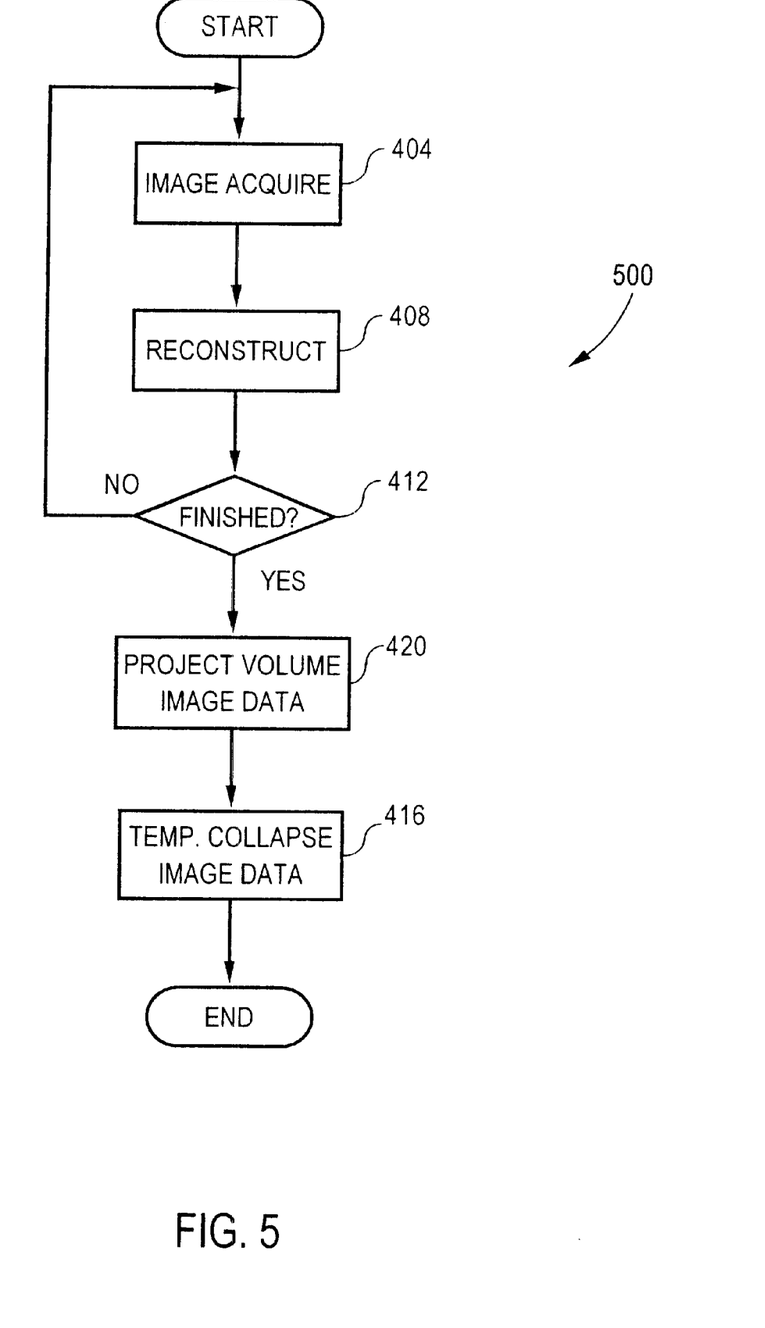
FIG. 5 is a flow chart outlining an exemplary method of the present invention.

Referring now to FIG. 4, there is shown an exemplary process 400 in accordance with this teaching which can be practiced in the MRI system 100 of FIG. 1. In a step 404, volume image data is acquired. The volume image data is preferably magnetic resonance data, and more preferably magnetic resonance angiography data. However, volumetric data from other modalities, such as computer tomography or other volumetric imaging modalities is also contemplated. After acquiring the volume image data, the volume image is reconstructed in a step 408 using array processor 124, and the reconstructed electronic image representation is stored in one of memories 130, 132, . . . , 134. The steps 404 and 408 are repeated until at least two volume representations, each image representation corresponding to different times, for the volume of interest are generated. When a desired or predetermined number, e.g., 2, 3, 4, 5, etc., of data sets are obtained, as determined at a step 412, the plurality of volume data sets is temporally collapsed at a step 416. In the temporal collapsing step, the time course projection processor 140 assigns the maximum intensity for each spatial position or corresponding voxel in the plurality of temporally displaced volume image representations to produce a temporally collapsed 3D image representation. An MRA spatial projection image is produced from the temporally collapsed 3D image in a step 420 by projecting the 3D image representation onto a 2D plane using maximum (or minimum) intensity projection techniques for rendering on the display 156. FIG. 5 illustrates an exemplary process 500 according to another embodiment of the present invention similar to that shown in FIG. 4, but wherein steps 416 and 420 are reversed.

The description above should not be construed as limiting the scope of the invention, but as merely providing illustrations to some of the presently preferred embodiments of this invention. In light of the above description and examples, various other modifications and variations will now become apparent to those skilled in the art without departing from the spirit and scope of the present invention as defined by the appended claims. Accordingly, the scope of the invention should be determined solely by the appended claims and their legal equivalents.

Having thus described the preferred embodiments, the invention is now claimed to be:

1. An angiographic imaging method comprising:

generating a plurality of temporally displaced volumetric image representations of a volume of interest, each depicted by a three-dimensional array of voxel values;

temporally collapsing the plurality of three-dimensional arrays of voxel values in accordance with a selected criterion to generate a temporally collapsed three-dimensional array of voxel values; and projecting in a selected direction the temporally collapsed three-dimensional array of voxel values in accordance with the selected criterion to generate a two-dimensional image representation.

2. The method according to claim 1, wherein the two-dimensional image representation is a maximum intensity projection and wherein the temporally collapsing step includes:

for corresponding voxels of each of the temporally displaced image representations, selecting a one of the voxel values with a maximum intensity.

3. The method according to claim 1, wherein the two-dimensional image representation is a minimum intensity projection and wherein the temporally collapsing step includes:

for corresponding voxels of each of the temporally displaced image representations, selecting a one of the voxel values with a minimum intensity.

4. The method according to claim 1, wherein the step of generating a plurality of temporally displaced volumetric image representations includes:

establishing a polarizing magnetic field in a volume of interest comprising a plurality of voxels;

applying a magnetic resonance scanning pulse sequence to excite resonance of selected dipoles in the volume of interest to generate spatially encoded magnetic resonance signals, said scanning pulse sequence selected from a three-dimensional scanning pulse sequence for generating spatially encoded magnetic resonance signals in the volume of interest and a two-dimensional scanning pulse sequence applied to a plurality of adjacent slices for generating spatially encoded magnetic resonance signals in the volume of interest;

receiving and sampling the magnetic resonance signals to generate k-space data; and converting the k-space data into a three-dimensional array of voxel intensities.

5. The method according to claim 1, further comprising:

before generating the image representations, administering a contrast agent to the volume of interest, such that at least some of the image representations are generated as the contrast agent is moving through the volume of interest.

6. The method according to claim 1, wherein the volumetric image representations are generated with one of a time-of-flight magnetic resonance angiographic technique and a phase contrast magnetic resonance angiographic technique.

7. The method according to claim 1, further including:

during the generation of the temporally displaced volumetric image representations, controlling acquisition of data from the volume of interest in accordance with a monitored physiological movement.

8. The method according to claim 1, further including:

during the generation of the temporally displaced volumetric image representations, controlling acquisition of data from the volume of interest in accordance with a cardiac cycle.

9. The method according to claim 1, further comprising:

logging time course information for one or more voxel positions of the volume of interest, the time course information including at least one of blood flow rate information, vessel wall dynamics information, contrast agent propagation information , and contrast agent peak arrival time information.

10. The method according to claim 1, wherein the projecting step is performed prior to the temporally collapsing step.

11. A diagnostic imaging method comprising:

generating a plurality of temporally displaced volumetric image representations of a volume of interest, each depicted by a three-dimensional array of voxel values; and spatially and temporally collapsing the plurality of three-dimensional arrays of voxel values in accordance with a selected criterion to generate a spatially and temporally collapsed two-dimensional image representation.

12. The method of claim 11, wherein the spatially and temporally collapsing step includes:

temporally collapsing the plurality of three-dimensional arrays of voxel values in accordance with a selected criterion to generate a temporally collapsed three-dimensional array of voxel values; and spatially projecting in a selected direction the temporally collapsed three-dimensional array of voxel values in accordance with the selected criterion to generate the spatially and temporally collapsed two-dimensional image representation.

13. The method according to claim 12, further including:

before the temporally collapsing step, defining a criterion for assigning intensity values for voxels of the temporally collapsed three-dimensional array, the criteria selected from a maximum and minimum value for corresponding voxel positions of the temporally displaced volumetric image representations; and examining the voxel values and determining a maximum or minimum value for each corresponding voxel position in the plurality of temporally displaced volumetric image representations.

14. The method of claim 11, wherein the spatially and temporally collapsing step includes:

spatially projecting in a selected direction each of said temporally displaced volumetric image representations in accordance with a selected criterion to generate a plurality of temporally displaced two-dimensional image representations; and temporally collapsing the plurality of two-dimensional image representations in accordance with the selected criterion to generate the spatially and temporally collapsed two-dimensional image representation.

15. The method according to claim 14, further including:

before the spatially projecting step, defining a criterion for spatially projecting each of said temporally displaced volumetric image representations, said criterion selected from a maximum or minimum value voxel value for projection rays in the selected direction; and examining the voxel values along the projection rays and determining a maximum or minimum value for each ray.

16. An image processing system including:

a reconstruction processor and associated memory for generating and storing a plurality of volume image representations of a volume of interest corresponding to a plurality of offset times;

a time course projection processor and associated memory for temporally collapsing and storing a plurality of temporally offset image representations into a single temporally collapsed image representation;

a spatial projection processor and associated memory for generating two-dimensional spatially projected image representations from volume image representations;

a first of the time course and spatial projection processors being connected with the reconstruction processor and a second of the time course and spatial projection processors being connected with the first for generating a two-dimensional temporally collapsed and spatially projected image representation; and a display apparatus for converting the two-dimensional temporally collapsed and spatially projected image representation into a human-viewable image.

17. The image processing system according to claim 16, wherein the time course projection processor is connected with the reconstruction processor.

18. The image processing system according to claim 16, wherein the spatial projection processor is connected with the reconstruction processor.

19. The image processing system according to claim 16, wherein the plurality of volume image representations are temporally collapsed by assigning the maximum intensity in time course for corresponding voxel positions, and further wherein the two-dimensional image representation is a maximum intensity projection.

20. The image processing system according to claim 16, wherein the plurality of volume image representations are temporally collapsed by assigning the minimum intensity in time course for corresponding voxel positions, and further wherein the two-dimensional image representation is a minimum intensity projection.

21. The image processing system according to claim 16, further comprising an electrocardiographic sensor.

22. The image processing system according to claim 16, further comprising a database containing time course information for one or more voxel positions of the volume of interest, the time course information including blood flow rate information, vessel wall dynamics information, contrast agent propagation information, or contrast agent peak arrival time information.

23. An angiographic imaging method comprising:

generating multiple volumetric image representations of a given volume of interest, each image representation depicted by a three-dimensional array of voxel values, and each image representation depicting the volume of interest at a different time;

performing one of a maximum and minimum intensity time course projection of the multiple image representations to generate a temporally-collapsed, three-dimensional array of voxel values; and generating one of a maximum and minimum intensity projection of the temporally collapsed, three-dimensional array of voxel values.

24. An angiographic imaging method comprising:

generating multiple volumetric image representations of a given volume of interest, each image representation depicted by a three-dimensional array of voxel values, and each image representation acquired at a different time with one of a time-of-flight magnetic resonance angiographic technique and a phase contrast magnetic resonance angiographic technique;

performing a time course projection of the plurality of three-dimensional arrays of voxel values to generate a temporally projected three-dimensional array of voxel values; and projecting in a selected direction the temporally projected three-dimensional array of voxel values to generate a two-dimensional image representation.

25. An angiographic imaging method comprising:

generating multiple volumetric image representations of a given volume of interest, each image representation depicted by a three-dimensional array of voxel values, the image representations being displaced in time;

logging time course information for one or more voxel positions of the volume of interest in accordance with cardiac phase;

performing a time course projection of subsets of plurality of three-dimensional arrays of voxel values with corresponding cardiac phase to generate cardiac phase corresponding three-dimensional array of voxel values; and spatially projecting each cardiac phase corresponding three-dimensional array of voxel values to generate corresponding two-dimensional image representations.

26. A diagnostic imaging method comprising:

generating multiple volumetric image representations of a given volume of interest, each image representation depicted by a three-dimensional array of voxel values, and each image representation depicting the volume of interest at a different time;

spatially projecting, in a selected direction, each of said temporally displaced volumetric image representations to generate a plurality of temporally displaced two-dimensional image representations; and temporally projecting the plurality of two-dimensional image representations to generate a single two-dimensional image representation.

27. An angiographic imaging method comprising:

generating a plurality of temporally displaced volumetric image representations of a subvolume of interest, each depicted by a three-dimensional array of voxel values, said subvolume of interest being contained within a larger volume of interest;

temporally collapsing the plurality of three-dimensional arrays of voxel values in accordance with a selected criterion to generate a temporally collapsed three-dimensional array of voxel values; and projecting in a selected direction the temporally collapsed three-dimensional array of voxel values in accordance with the selected criterion to generate a two-dimensional image representation of the subvolume of interest.

28. The method of claim 27, further comprising:

generating a two-dimensional image representation of the volume of interest comprising:

said two-dimensional image representation of the subvolume of interest; and non-time resolved voxel intensity values representing areas within the volume of interest which are outside the subvolume of interest.

\* \* \* \* \*